Patented Feb. 6, 1923.

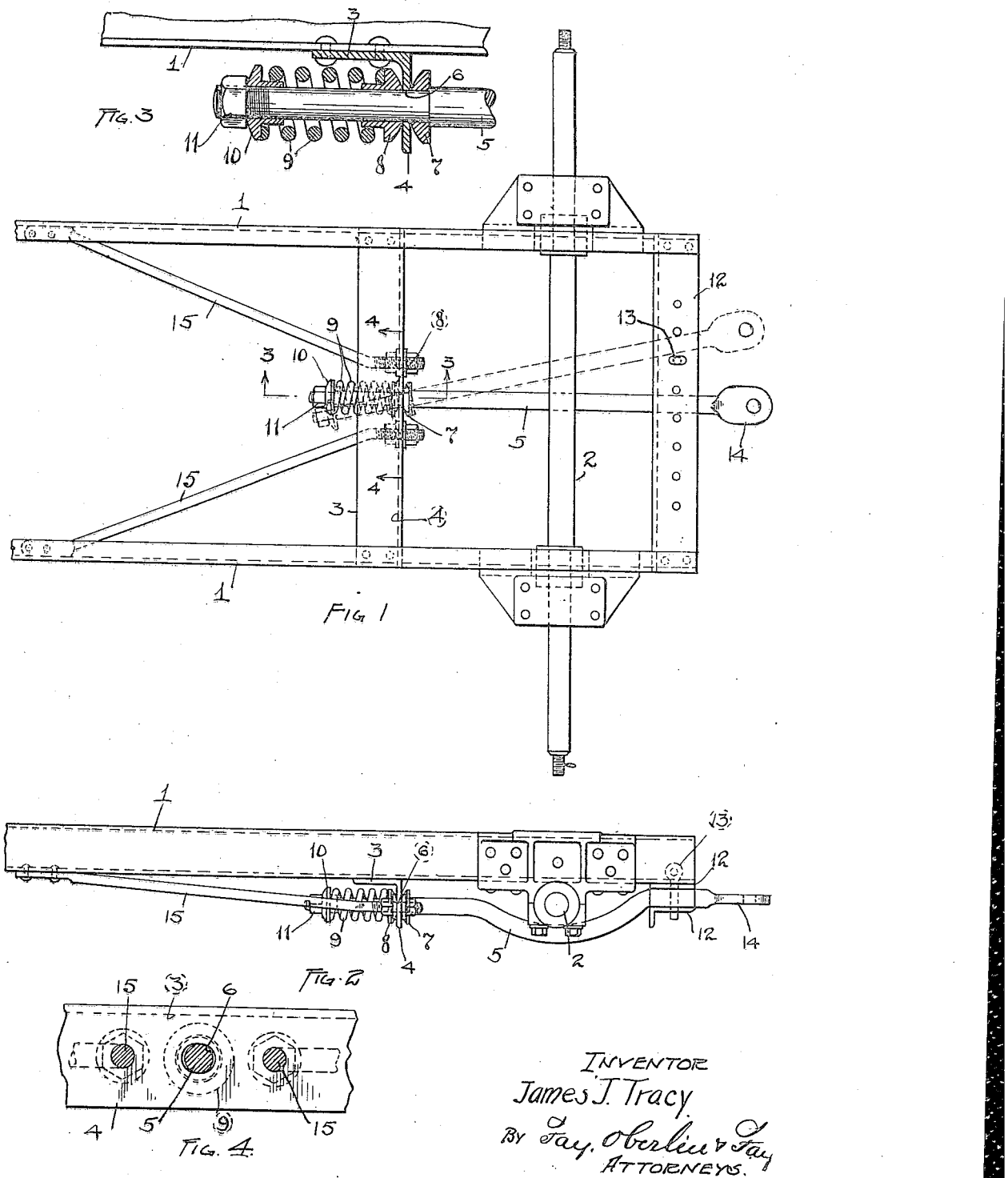

1,444,402

UNITED STATES PATENT OFFICE.

JAMES J. TRACY, OF CLEVELAND, OHIO.

DRAWBAR RIG FOR TRACTORS.

Application filed February 27, 1918. Serial No. 219,432.

*To all whom it may concern:*

Be it known that I, JAMES J. TRACY, a citizen of the United States, and a resident of Cleveland, county of Cuyahoga, and State of Ohio, have invented a new and useful Improvement in Drawbar Rigs for Tractors, of which the following is a specification, the principle of the invention being herein explained, and the best mode in which I have contemplated applying that principle so as to distinguish it from other inventions.

The present improvements have as their object the provision of a draw-bar rig for tractors, which will be simple and strong, and at the same time provide against unnecessary shock upon either the tractor itself or the machine being drawn thereby. A further object is to provide a draw-bar that may be swung from one side to the other as is frequently desirable, particularly in agricultural tractors, where a plow or like machine requires to be drawn to one side or the other of the center line of the tractor.

To the accomplishment of the foregoing and related ends, said invention, then, consists of the means hereinafter fully described and particularly pointed out in the claim, the annexed drawing and the following description setting forth in detail certain mechanism embodying the invention, such disclosed means constituting, however, but one of various mechanical forms in which the principle of the invention may be used.

In said annexed drawing:—

Fig. 1 is a plan view of the rear portion of a tractor frame showing my improved draw-bar rig installed therein; Fig. 2 is a side elevational view of the same; and Figs. 3 and 4 are vertical central sections of a detail taken on the planes indicated by the lines 3—3 and 4—4, respectively, Fig. 1.

The construction of the main frame of the tractor illustrated in the foregoing drawing is of course more or less typical, said frame comprising channeled side members 1 connected together by a plurality of transverse plates or angle bars. There is also shown the shaft 2 upon which the traction wheels or equivalent traction members, where the machine is of the track-laying or planking-tread type, are mounted.

As one of the transverse members of the frame, I utilize an angle bar 3, attaching the same to the side channels 1 some distance forwardly of said shaft with one angle 4 of the bar directed downwardly so as to provide a vertically disposed flange, as clearly shown in Fig. 2. The draw-bar proper 5 is then attached to this flange at a point approximately midway between the ends of the bar. With this object in view an aperture 6 is formed in the flange at the point indicated, and the forward end of the bar is passed therethrough. Fixedly secured to the bar, so as to bear against the rear face of the flange, is a washer 7 with its contacting face coned or rounded away and a similarly formed, but loosely mounted, washer 8 bears against the front face of the flange, being held thereagainst by means of a heavy compression spring 9 interposed between the same, and a third washer 10 secured to the rod adjacent its outer end by means of a nut 11.

From the foregoing construction it will be seen that the bar is free to oscillate, particularly in the horizontal plane to which its movement is confined by having its rear end held between two plates or bars 12 that serve to connect the rear ends of the side members 1 of the frame. The two bars between which the rear end of the draw-bar is thus held are provided with a series of corresponding holes through which a pin 13 may be inserted, and thus limit the oscillation of the draw-bar in one direction. The rear extremity of the draw-bar is formed as usual with an eye 14 to permit of the coupling thereto of a trailer, plow or other implement.

Extending from points on the side members 1 of the frame, well forward of the angle-bar 3, to which the front end of the draw-bar is attached, to points adjacent the point of attachment of the draw-bar to the flange 4 of such angle bar are two struts 15 which serve to transmit the strain imposed on said flange directly to said side members. These struts at the same time obviously increase the general rigidity of the frame.

By reason of the construction just described, accordingly, the pull of the draw-bar is well distributed throughout the frame of the tractor, so that no one portion thereof is unduly strained. At the same time the compression spring, arranged in the fashion indicated, takes up the jar or shock incident to starting with a heavy load, and by virtue of its capacity to oscillate, the draw-bar can be readily adjusted to pull a plow or other implement in a path to one side or the other of the central line of the tractor.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In mechanism of the character described, the combination with a tractor frame including approximately parallel channel side members; of a transverse angle-bar secured at its ends to the under sides of said members and having a flange directed downwardly, said flange having an aperture intermediate of its ends; a draw-bar having its forward end projecting through such aperture; a pair of transverse plates spaced one above the other, attached to said side members to the rear of said flange and supporting said bar therebetween, so as to limit movement thereof to an approximately horizontal plane; adjustable means on said plate for limiting the oscillation of said bar in one direction only in such plane; struts attached to and extending from points on said flange adjacent the point of attachment of said bar thereto to points on said side members located forwardly of said flange; coned washers on said draw bar on either side of said flange, a spring abutment on the forward end of said bar, and a coil spring between said abutment and the forward washer for restraining longitudinal movement of said bar.

Signed by me, this 25th day of February, 1918.

JAMES J. TRACY.